United States Patent [19]

Brown

[11] 4,039,450
[45] Aug. 2, 1977

[54] CONTINUOUS TUBULAR FILTER AND METHOD OF USING THE SAME

[76] Inventor: Judson G. Brown, 11 Arcadia Road, Andover, Mass. 01810

[21] Appl. No.: 674,818

[22] Filed: Apr. 8, 1976

[51] Int. Cl.² ............................................ B01D 33/00
[52] U.S. Cl. ...................................... 210/77; 198/819; 210/396; 210/400
[58] Field of Search ................. 210/77, 386, 387, 400, 210/401, 65, 396; 162/202, 292, 295, 384; 198/819, 839

[56] References Cited

U.S. PATENT DOCUMENTS

| | | | |
|---|---|---|---|
| 2,293,977 | 8/1942 | Hoffstetter | 198/839 X |
| 2,796,810 | 6/1957 | Muller | 162/295 X |
| 2,866,827 | 12/1958 | Jurgeleit et al. | 210/400 X |
| 3,335,862 | 8/1967 | Hirs | 210/400 X |
| 3,338,383 | 8/1967 | Hashimoto | 198/819 |
| 3,369,663 | 2/1968 | Serrell | 210/401 X |
| 3,508,663 | 4/1970 | Brill | 210/400 X |
| 3,523,077 | 8/1970 | Camirand et al. | 210/65 |
| 3,654,074 | 4/1972 | Jacquelin | 162/295 X |

FOREIGN PATENT DOCUMENTS

| | | | |
|---|---|---|---|
| 1,270,842 | 4/1972 | United Kingdom | 210/400 |
| 1,298,581 | 12/1972 | United Kingdom | 210/400 |

OTHER PUBLICATIONS

Manor-Guva, Filtration and Separation, Nov./Dec. 1971, pp. 782, 783.

Primary Examiner—Frank W. Lutter
Assistant Examiner—Richard L. Chiesa
Attorney, Agent, or Firm—Richard L. Stevens

[57] ABSTRACT

A filter belt is formed into a tube which follows a substantially U-shaped path. Feed is introduced into the tube and by hydrostatic pressure is filtered. The tube is opened and the cake removed and the tube reformed.

14 Claims, 6 Drawing Figures

U.S. Patent  Aug. 2, 1977  Sheet 1 of 2  4,039,450
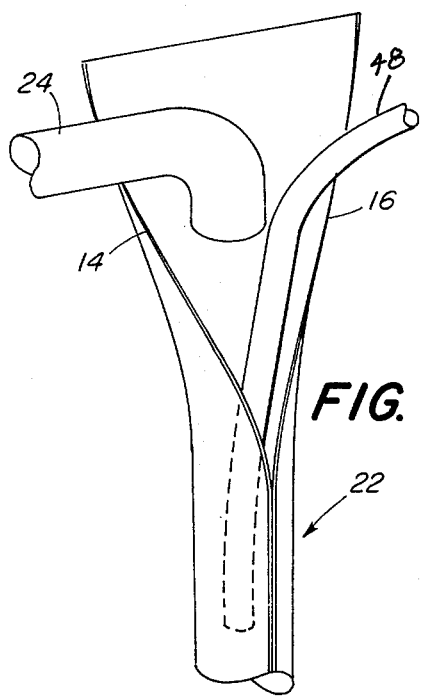
FIG. 2
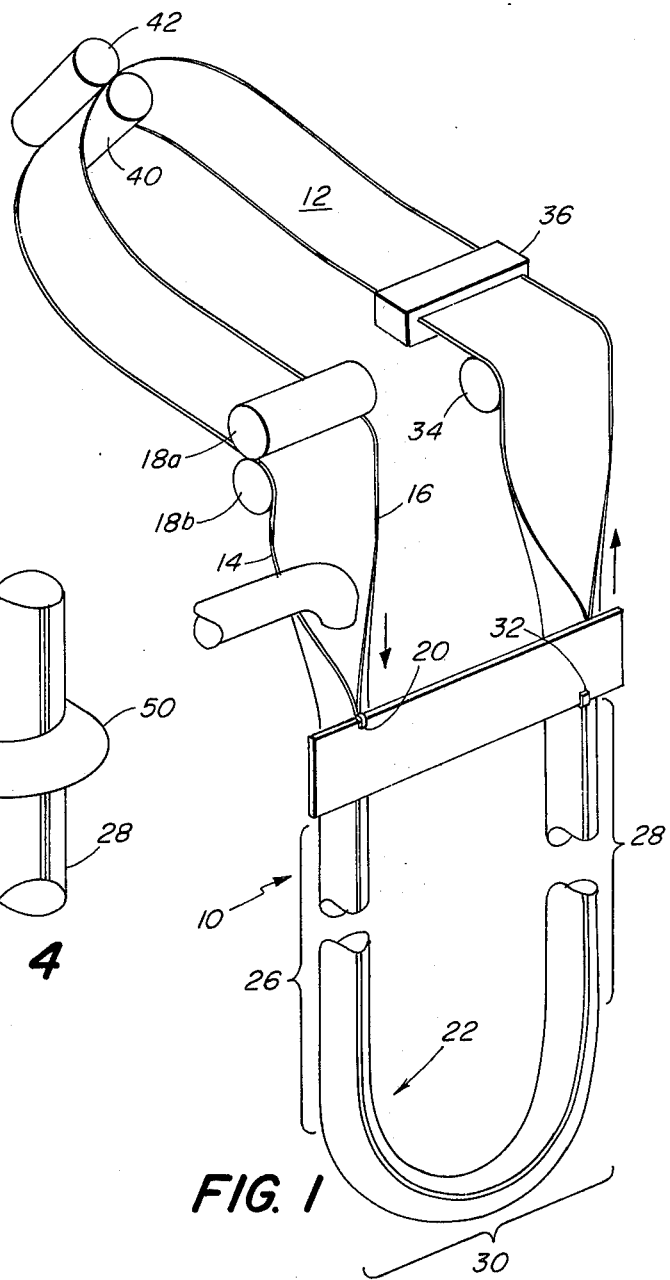
FIG. 4
FIG. 1
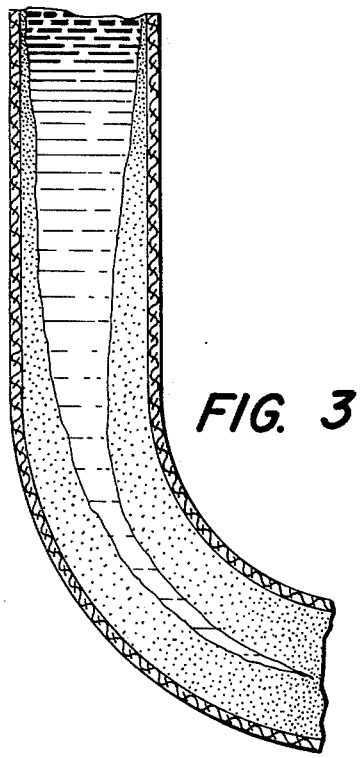
FIG. 3
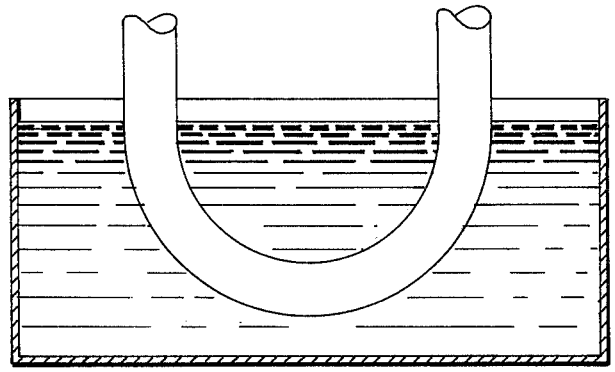
FIG. 5

CONTINUOUS TUBULAR FILTER AND METHOD OF USING THE SAME

BACKGROUND OF THE INVENTION

In filtering, many arrangements have been proposed employing hydrostatic pressure and gravity to force a liquid through a porous septum or medium. The prior art in this particular field is probably best represented by U.S. Pat. No. 3,523,077; British Pat. Nos. 1,298,581 and 1,270,842; and an article in *Filtration and Separation*, Nov–Dec 1971, page 782. This last-cited reference broadly teaches the use of hydrostatic pressure and gravity for filtering wherein two vertically disposed filter cloths are joined at their edges to form a funnel-like arrangement (Manor-Guva tower press).

In this last-cited reference, the seal for the edges of the filter cloths is accomplished by pressure clamping. The entire filter includes top, center and bottom sections. The cloths are sandwiched with belts or clamped together. The center cloth section is supported from the back but filled with fluid (feed) in the center. This Guva tower traveling vertical double belt filter requires a balance of height (hydrostatic pressure) and belt speed to match a given feed so that a filter cake will be produced at the bottom section. The cake in the discharge gap of the bottom section must be stiff enough to resist the hydrostatic pressure and not be extruded or blown out the bottom. Variable gap pressure rolls at the bottom section of the Guva tower press can compress a cake of variable thickness depending upon the plastic flow characteristics of the produced cake. Broadly, the lower portion of the Guva tower press employs a parastolic action with the varying compression of the rolls. It appears that the Guva tower press has no problem discharging the cake, but it must insure that there is no liquid core present in the bottom section. If there is, liquid will be discharged with the cake. Therefore, Guva teaches the compaction due to hydrostatic pressure and gravity upstream of the bottom section utilizing the pressure rolls which squeeze the porous cake. The steadily increasing pressure of Guva which forms a compacted ribbon of cake is limited by the height of the chamber above the pressure rolls and the ability of the edge seals to hold. The British patents broadly refer to inherent hydrostatic pressure in forcing the liquid through the filter cloth. Further, the essence of the British patents is directed to a press zone that tapers.

The reason that the British references and the Guva tower press require this tapering and/or squeezing action is that the liquid core in the center of the column of feed to be filtered cannot be allowed at the discharge end. That is, the cakes formed within the filter must be pushed together to form a stiff cake that does not flow axially. This is done to prevent blow-out at the bottom. However, it also prevents any transmission of hydrostatic pressure from the point where the cake becomes stiff and stops flowing. No further pressure build-up can occur if the cross-sectional area of the filter remains the same. With these prior art devices, with a constant cross-section there is no further filtering or pressing of the cake. Therefore, the solution of the prior art is a decreasing taper or pressure rolls so that additional pressure can be applied. The tapering of the filter and/or the use of external pressure rolls add to the cost and difficulty of filtering with such apparatus.

BRIEF SUMMARY OF THE INVENTION

The present invention is directed to a filter employing hydrostatic pressure and gravity and a method of using the filter. The filter is substantially tubular in cross-section and when filtering, is integrally formed and self-supporting.

In a preferred embodiment of the invention, a filter is formed from a continuous belt or a filter medium, such as a filter cloth. Along each edge of the belt are matching halves of a continuous zipper or equivalent structure to seal continuously the belt to form a substantially tubular filter. The belt passes through a zipper closure station which converts it into the tube by sealing the two sides together. The tubular filter is suspended and travels along a substantially U-shaped path. When traveling in the path, the tube comprises a feed side, a bottom portion, and a discharge side. The tube shape continues down to the bottom of the feed side of the U-shaped path, across the bottom portion, and up the discharge side. At the termination of the discharge side, the zipper is opened and the tube again becomes a flat belt, where the cake is removed. The weight of the feed to be filtered provides the pressure to force the filtrate through the filter belt.

In an alternative embodiment of the invention, after the belt has been opened and the cake discharged, the position of the filter belt is inverted such that when the tube is reformed on the feed side, the previous inner surface becomes the outer surface.

The present invention includes a moving closed single tubular shaped filter which relies substantially upon increasing hydrostatic pressure to effect removal of the filtrate. My invention broadly includes a filter belt formed into a self-supporting integral tube, which tube is suspended and moved along a substantially U-shaped path. A feed stream is introduced into the tube and by hydrostatic pressure is filtered. The flow rate is controlled such that the inner core of fluid formed may extend entirely along the first leg of the U-shaped tube. This maximizes the use of the hydrostatic pressure within the geometric limitations of the suspended tube. The tube is opened at the end of the last leg and the cake removed.

BRIEF DESCRIPTION OF THE DRAWINGS

FIG. 1 is a perspective illustration of the preferred embodiment of the invention;

FIG. 2 is a front elevation of the tube-forming portion of the invention;

FIG. 3 is a front elevation in section of a material filtered with the tube of the invention;

FIG. 4 is a front elevation of an alternative embodiment of the invention;

FIG. 5 is a front view of a further alternative embodiment of the invention.

DESCRIPTION OF THE PREFERRED EMBODIMENT

Figure 6:
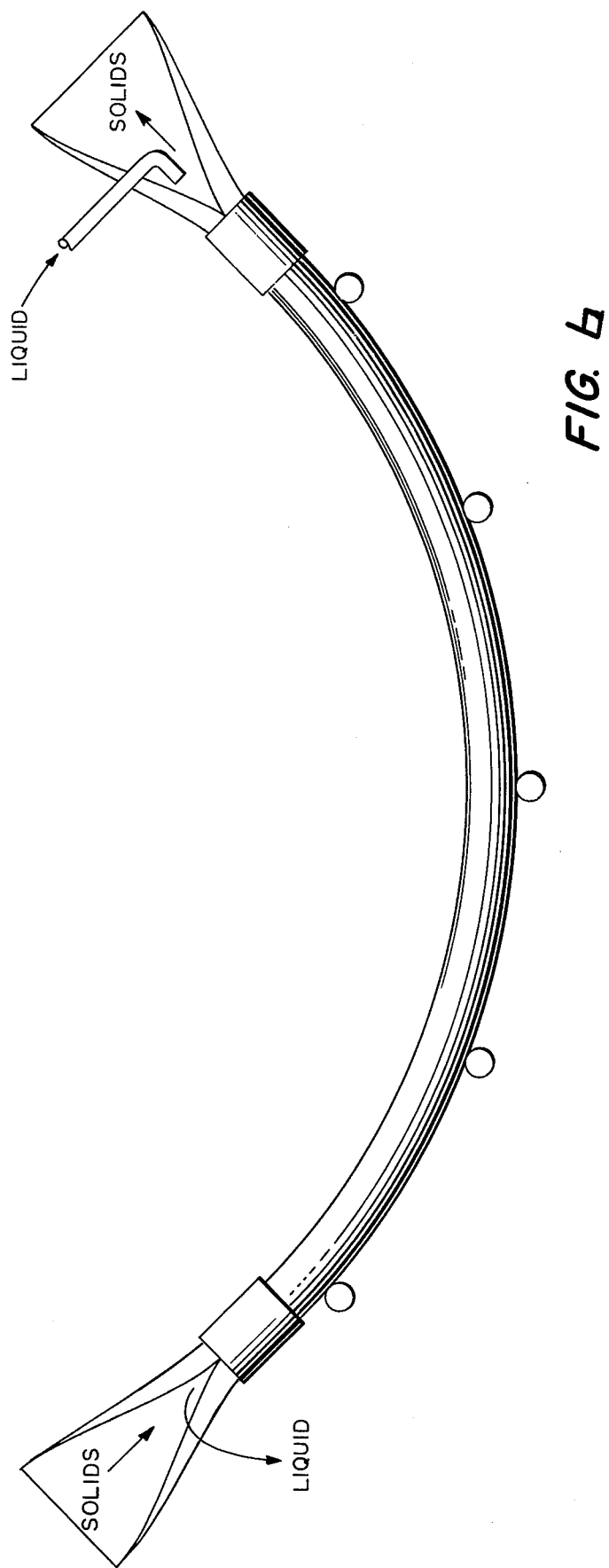
FIG. 6 is a front view of a still further embodiment of the invention.

The invention will be described in reference to the filtration of sewerage sludge on a continuous basis. As will be apparent, the operation of the invention may be on either a continuous or intermittent basis.

Although a specific filter cloth belt is illustrated, it is to be understood that any type of filtering medium or porous septum may be used, depending upon the type of material or feed to be filtered. This includes but is not limited to membranes whether supported or not; any type of woven metals; woven fabrics, synthetic or natural; porous plastics; nonwoven fabrics; papers, etc. The filter medium must be capable of withstanding the hydrostatic pressures to be used and of course capable of being sealed and unsealed and formed into a tubular configuration.

Referring to FIG. 1, a filter assembly embodying the invention is shown generally at 10, comprises a filter belt 12 having zipper edges 14 and 16, shown more clearly in FIG. 2. The belt 12 passes through drive and support rollers 18a and 18b and through a zipper closing station 20. The zipper is a standard commercially available item which has been sealed along its entire length to the edges of the filter cloth. Each zipper edge comprises longitudinally extending parallel tongues and grooves which mate when the edges 14 and 16 are joined or sealed together. For example, such zipper edges are available from Minigrip Inc. of Orangeburg, N.Y., Style 34-2T. The closure station 20 per se is well known in the zipper art and need not be described in detail. When the belt 12 passes through the station 20, the edges 12 and 14 seal one to the other, forming a tube 22. Referring to FIG. 2, a feed conduit 24 introduces the feed into the tube 22. The tube hangs downwardly and turns upwardly forming a U-shaped configuration which comprises a feed side 26, a discharge side 28, and a bottom portion 30.

The discharge side passes through a zipper opening station 32 where the edges are unsealed and the tube is converted back to the belt 12. The belt 12 passes over a support roller 34 and the cake is removed such as by a doctor blade assembly 36.

Reversing rollers 40 and 42 are disposed downstream of the doctor blade assembly 36 and upstream of the rollers 18a and 18b. This reversing feature is advantageously used in the present invention, but may be used with any belt-type filter arrangement such as described in the above prior art references. The reversing feature results in a self-plugging backwash and reduces the need for air and/or water jets to purge the filter belt after each filtering cycle. The belt 12 comprises a cake side (the side from which the cake is removed) and a filtrate side. As the belt passes between the rolls 40 and 42, it is rotated about its longitudinal axis at approximately 90°. As it travels toward the rollers 18a and 18b, it is further rotated in the same direction approximately 90°, such that when the belt 12 passes between the drive and guide rollers 18a and 18b, it has been rotated 180°. This results in the tube 22 subsequently formed having the prior cake side now being the filtrate side and the prior filtrate side now being the cake side.

The method of the invention will be described in reference to the dewatering of sewerage sludge. An endless filter cloth, of woven polypropylene, nominal pore size of 50 microns (30 × 110 mesh), approximately 600 feet long and 2 to 4 inches diameter has mating zipper edges 14 and 16 as shown in FIG. 2. The zipper edges are sealingly secured to the edge of the filter cloth such as by adhesives, sonic welding, etc.

As shown in FIG. 1, the cloth passes through the drive and guide rolls 18a and 18b, and the zipper closure station 20 where the tube 22 is formed and subsequently hangs freely. The distance from the zipper closure station 20 to the bottom portion 30 of the tube 22 comprising the length of the feed side 26 is approximately 250 feet, which provides a pressure differential of 100 lb. per sq. inch. The filter cloth is threaded through the zipper opening station 32, placed over the roller 34, and through the doctor blade assembly 36 and the rollers 40 and 42. The driven roller 18b is rotated by a motor or other motive means (not shown) and the filter belt drawn therethrough by frictional engagement with the rollers 18a and 18b.

Sewerage sludge of about 3–5% solids, say for example 5% solids, is introduced into the feed side 26 of the tube 22 via a feed conduit 24. The sewerage sludge typically has been pretreated with ferric chloride and calcium carbonate to make it more filterable. The tube travels along a U-shaped path such as shown in FIG. 1.

Referring to FIG. 3, it can be seen that as the hydrostatic pressure increases from the top to the bottom of the feed side of the tube and that the amount of cake on the wall also increases. A core of fluid is present along the entire feed side. This allows the pressure to continue along this entire feed side. If this fluid core were not present, the cake would stiffen and no further filtering or pressing of the cake would occur unless external pressure was applied such as by rollers, since the cross-section remains substantially the same. The fluid core transmits the hydrostatic pressure along the feed side, increasing the cake compressing pressure. It is not necessary that the fluid core continue through to the bottom portion 30 and/or through to the discharge side 28, although in a particular operation, this may occur.

At the bottom of the feed side 26, the feed has been compressed to about 30–45% solids, say for example 40% solids. The cross-sectional area of the tube 22 remains substantially the same. However, it may neck slightly at the top of the feed and discharge sides and may flatten out when it passes into and out of the bottom portion imparting kneading action thereto. The feed is filtered at a rate of about 10 lb. per sq. foot per hour. When the tube 22 passes through the zipper opening station 32 it is converted to the belt 12 and the cake subsequently removed by the doctor blade assembly 36. The belt while passing through the rollers 40 and 42 is reversed as described above and the tube is subsequently reformed. If desired, the belt 12 need not be reversed.

Referring to FIG. 4, an alternative embodiment of the invention is shown wherein a circumferential wiper blade assembly 50 is disposed about the outer surface of the discharge side 28 of the tube 22 to remove the filtrate therefrom.

In FIG. 2, a further embodiment of the invention is shown wherein a plurality of streams are introduced into the tube 22 via conduits 24 and 48. For example, conduit 24 can be for a feed stream and the conduit 48 could be used for a precoat addition or cake washing, chemical reactions, leaching, or other liquid-solid reactions. Although only one additional conduit 48 has been shown introduced into the tube 22, a plurality of additional conduits may be used to introduce the various streams at the same or different levels in both sections 26 and 28 of the tube.

In FIG. 5, the lower portion of the tube 22 is submerged in collected filtrate at a significant depth to reduce or hold down the maximum internal hydrostatic pressure to enhance tube life and/or to prevent too much compaction of the cake.

In FIG. 6, an alternative embodiment of the invention utilizing the tubular configuration for liquids-solids contact with a nonporous belt is shown. As with the preferred embodiment, the tube is opened to form a belt and then closed to form the tube. The tube closing station is located at a lower elevation than the tube opening station, whereby a fluid can be added into the open top above the tube opening station where the solids are being removed. The fluids will flow countercurrent to the solids and out the lower open end where the solids enter. This concept is particularly applicable for countercurrent ion exchange resin contact, activated carbon beds, chemical leaching, washing, etc. As shown in FIG. 6, support rollers are used at the bottom portion to prevent buckling, kinks, etc. It is to be understood that the configuration shown in FIG. 6, with or without support rollers, may be used for a filtration process such as described in the preferred embodiment. That is, the tubular configuration, whether it is used for filtration or an ion exchange process, may be substantially as shown in FIGS. 1 and 6, with or without a support structure such as support rollers. Also. compression rollers may be used at any location of the tube to enhance the filtration or ion exchange processes.

Having described my invention, what I now claim is:

1. A method for filtration by hydrostatic pressure and gravity which includes:
    a. forming a filter belt into an integral tube by sealing continuously the edges of the belt;
    b. moving the tube along a substantially U-shaped path, the path comprising a feed side, a bottom portion, and a discharge side;
    c. introducing a feed stream into the tube;
    d. increasing the hydrostatic pressure in the feed side from the upper to the lower portion of the feed side;
    e. forming a cake on the inner walls of the tube and causing said cake formation substantially solely by the hydrostatic pressure;
    f. forming a liquid core within the cake, and extending said liquid core along the length of the feed side;
    g. opening the tube downstream of the discharge end to form the belt; and
    h. removing the cake formed.

2. The method of claim 1 which includes:
introducing a plurality of streams into the tube.

3. The method of claim 2 which includes introducing the streams at a plurality of different points along the longitudinal axis of the feed side into the tube.

4. The method of claim 1 which includes:
controlling the belt speed such that the liquid core extends into the bottom portion of the tube.

5. The method of claim 1 which includes:
controlling the belt speed into the tube such that the liquid core extends to just above the lowest portion of the feed side.

6. The method of claim 1 which includes:
maintaining the cross-section of the tube substantially uniform as it travels along the U-shaped path.

7. The method of claim 1 wherein the tube has a cake side and a filtrate side and which includes:
wiping the filtrate side of the tube to remove filtrate therefrom.

8. The method of claim 1 wherein the tube has a cake side and a filtrate side and which includes:
reversing the orientation of the belt downstream of the discharge side whereby when the tube is formed the filtrate and cake side of the belt are continuously reversed in each cycle of filtration.

9. The method of claim 1 which includes forming the tube at a first level and opening the tube at a second level, the first and second levels lying in substantially the same plane.

10. The method of claim 1 which includes maintaining the feed side in a substantially vertical position.

11. A filter apparatus which comprises:
    a. a filter belt;
    b. means to form the belt into an integral tubular filter;
    c. means to suspend the tube such that it forms a substantially U-shaped configuration, the tube including a substantially vertical feed side, a bottom portion, and a discharge side;
    d. means to introduce a feed stream into the feed side of the tube and to fill the feed side of the tube with the feed stream;
    e. means to control the belt speed to form a cake on the inner walls of the tube and a liquid core within the cake;
    f. means to open the tube disposed downstream of the discharge side to convert the tube back into the filter belt;
    g. means to remove cake formed in the tube and remaining on the belt, said means spaced apart from the means to open the tube; and,
    h. means to move the belt along the U-shaped configuration.

12. The apparatus of claim 11, which includes:
means to reverse the orientation of the belt about its longitudinal axis disposed between the means to open the belt and the means to close the belt such that the sides of the filter are reversed for each filtering cycle.

13. The apparatus of claim 11, which includes:
means to maintain the feed and discharge sides of the tube in a substantially vertical configuration.

14. The apparatus of claim 11 wherein the means to form the belt into a tube is disposed downstream of the means to place the feed stream; and the means to open the tube is disposed upstream of the means to remove the cake.

* * * * *